(12) United States Patent
Jin et al.

(10) Patent No.: US 8,965,920 B2
(45) Date of Patent: Feb. 24, 2015

(54) DISTRIBUTING AND SHARING CONTENT IN A NETWORK

(75) Inventors: Zhiying Jin, Lexington, MA (US); Jack Jianxiu Hao, Lexington, MA (US); Fang Zhu, Woburn, MA (US); Wei Xia, Sudbury, MA (US); Guanrao Chen, Woburn, MA (US); Alex Sakharov, Natick, MA (US); Gaurav D Mehta, Brighton, MA (US)

(73) Assignee: Verizon Patent Licensing Inc., Basking Ridge, NJ (US)

( * ) Notice: Subject to any disclaimer, the term of this patent is extended or adjusted under 35 U.S.C. 154(b) by 1163 days.

(21) Appl. No.: 12/334,889

(22) Filed: Dec. 15, 2008

(65) Prior Publication Data

US 2010/0153410 A1    Jun. 17, 2010

(51) Int. Cl.
G06F 17/30    (2006.01)

(52) U.S. Cl.
CPC .... *G06F 17/30035* (2013.01); *G06F 17/30569* (2013.01)
USPC ......................................... 707/770

(58) Field of Classification Search
CPC ........................................................ G06F 17/30
USPC ..................................... 707/769, 781, 770
See application file for complete search history.

(56) References Cited

U.S. PATENT DOCUMENTS

| 2005/0136949 A1* | 6/2005 | Barnes, Jr. ................... 455/461 |
| 2007/0094691 A1* | 4/2007 | Gazdzinski ................... 725/62 |
| 2008/0155615 A1* | 6/2008 | Craner et al. ................. 725/91 |

\* cited by examiner

*Primary Examiner* — Hosain Alam
*Assistant Examiner* — Johnese Johnson

(57) ABSTRACT

A method may include receiving, from a first user device associated with a user profile, a first request for a media file and streaming the media file over a network to the first user device in a first format appropriate for the first device. The method may also include stopping the streaming of the media file and associating a stop time with the stopping, wherein the stop time indicates a position in the media file and receiving, from a second user device different from the first user device, a second request for the media file, the second user device being associated with the user profile. The method may also include streaming, starting at the stop time, the media file over the network to the second user device in a second format appropriate for the second device and different than the first format.

21 Claims, 16 Drawing Sheets

(COPY 1)

| CODEC 640.1 | MPEG-2 |
| RESOLUTION 642.1 | LD |
| STREAMING ADDR 644.1 | HTTP://CONTENT.COM/1234.1 |

(COPY 2)

| CODEC 640.2 | MPEG-4 |
| RESOLUTION 642.2 | HD |
| STREAMING ADDR 644.2 | HTTP://CONTENT.COM/1234.2 |

METADATA TABLE 600

| CONTENT ID 602 | 1234 |
| TYPE 604 | VIDEO |
| OWNER 606 | JOHN SMITH |
| CREATION DATE 608 | 2008.12.3.1200 |
| PUBLIC 612 | FALSE |
| PRIVATE 614 | FALSE |
| GROUP 616 | FAMILY |
| GEOTAG 618 | 71N, 74W |
| AUTHOR 620 | JOHN SMITH |
| COPYRIGHT 622 | CC (BY, NC) |
| ORIGINAL PATH 624 | /HOME/JSMITH/1234 |
| BLOG 626 | HTTP://BLOGS.COM/1234 |

USER PROFILE TABLE 700

| NAME 702 | JOHN SMITH |
| --- | --- |
| DN 704 | 2022513434 |
| DEVICE MODEL 706 | LG9600 |
| DEVICE SOFTWARE VERSION 708 | 2008.12 |
| HISTORY 714 | 1234 (3:20.00); 5678 (1:23:34.00) |
| FAVORITES 716 | 1234; 8921; 4524 |
| NOTIFICATION 718 | 2022513434, 2023459292, 7035678989 |

(GROUP 1)

| GROUP NAME 710.1 | FAMILY |
| --- | --- |
| GROUP MEMBERS 712.1 | JANE SMITH, MARY SMITH |

(GROUP 2)

| GROUP NAME 710.2 | FRIENDS |
| --- | --- |
| GROUP MEMBERS 712.2 | CHRIS JONES, MARY JONES |

800

1000

1200

1400

1600A

1600B

DISTRIBUTING AND SHARING CONTENT IN A NETWORK

BACKGROUND INFORMATION

Today, people create and experience content (e.g., media such as videos and audio) using all sorts of devices, such as mobile phones, laptops, televisions, smart phones, personal digital assistants (PDAs), and stationary phones. In some instances, content may be regarded as for one of these devices without consideration for other devices (e.g., movies are for the television). People may turn on their television for one type of content, their computer for another type of content (e.g., YouTube), and their stereo for music. Further, each device may obtain their content from a different type of source.

BRIEF DESCRIPTION OF THE DRAWINGS

FIG. 6 is a diagram of an exemplary metadata table;

FIG. 7 is a block diagram of an exemplary user profile table;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Users may want to experience a piece of content on more than just one of their devices—such as watching a movie on your cell phone, or watching a video recorded on your cell phone on a television. People may also want to share the content they create or experience with others. Embodiments disclosed herein may allow for content (e.g., media such as movies and music) to be shared from one user to another (e.g., from one user's device to another user's device). Embodiments disclosed herein may also allow for content to be shared among different types of devices, such as sharing content from a mobile phone to a television and vice versa.

Figure 1:
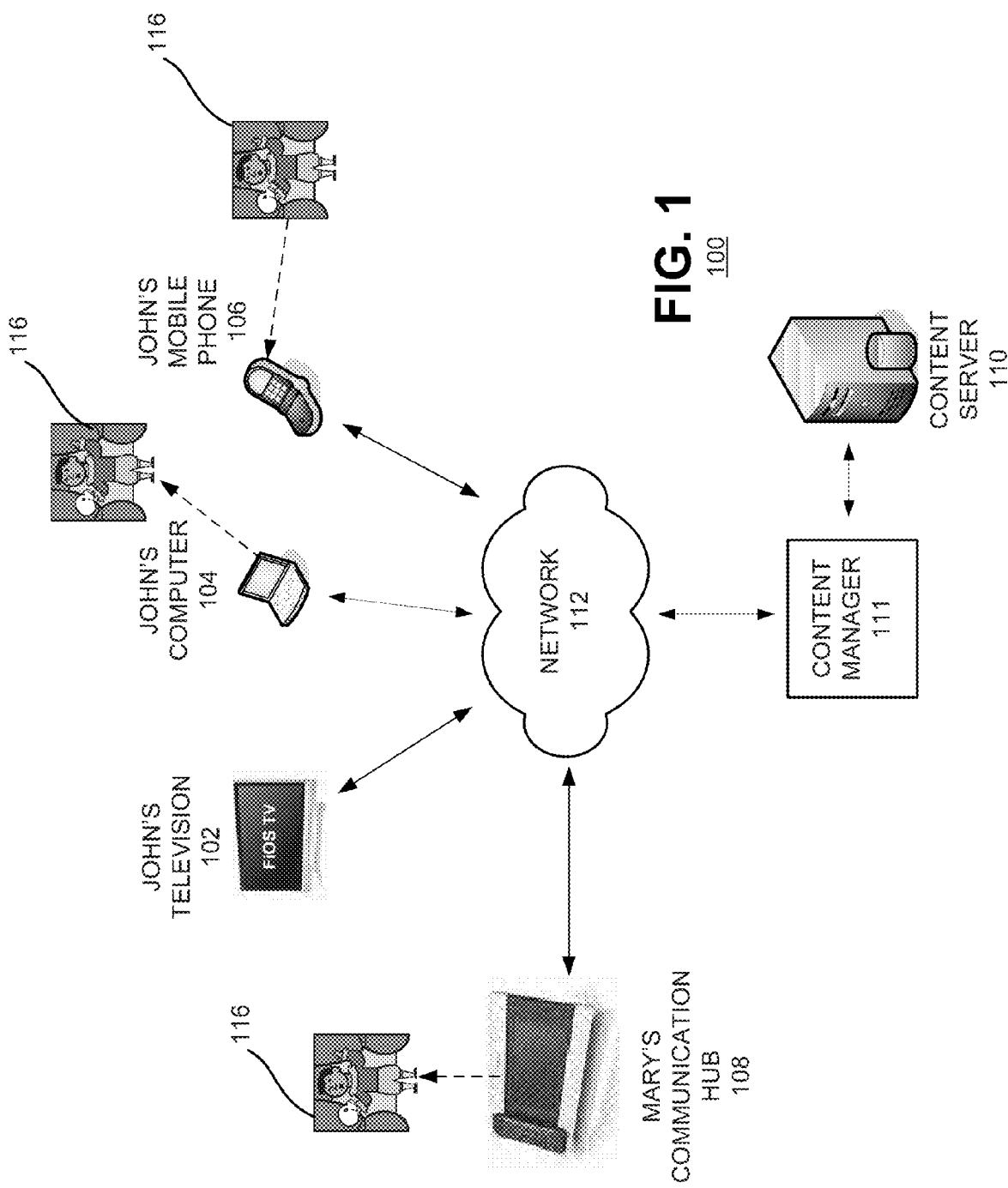
FIG. 1 is a block diagram of an exemplary environment in which embodiments disclosed herein may be implemented.

FIG. 1 is a block diagram of an environment 100 in which embodiments disclosed herein may be implemented. Environment 100 may include John's television (TV) 102, computer 104, and mobile phone 106. Environment 100 may also include Mary's communication hub (hub) 108, a content server 110, a content manager 111, and a network 112. Network 112 may allow all the other components to communicate with each other and content manager 111 may allow the sharing and viewing of content stored in content server 110 among different devices (e.g., devices 102-108).

In the exemplary embodiment of FIG. 1, John may record his son's play 116 at school with mobile phone 106. John may then share the video of play 116 with Mary, who may watch a recording of the play 116 suited for hub 108 at home, for example. In addition, John may watch a recording of the play 116 suited for his computer 104 at work, for example.

Figure 2:
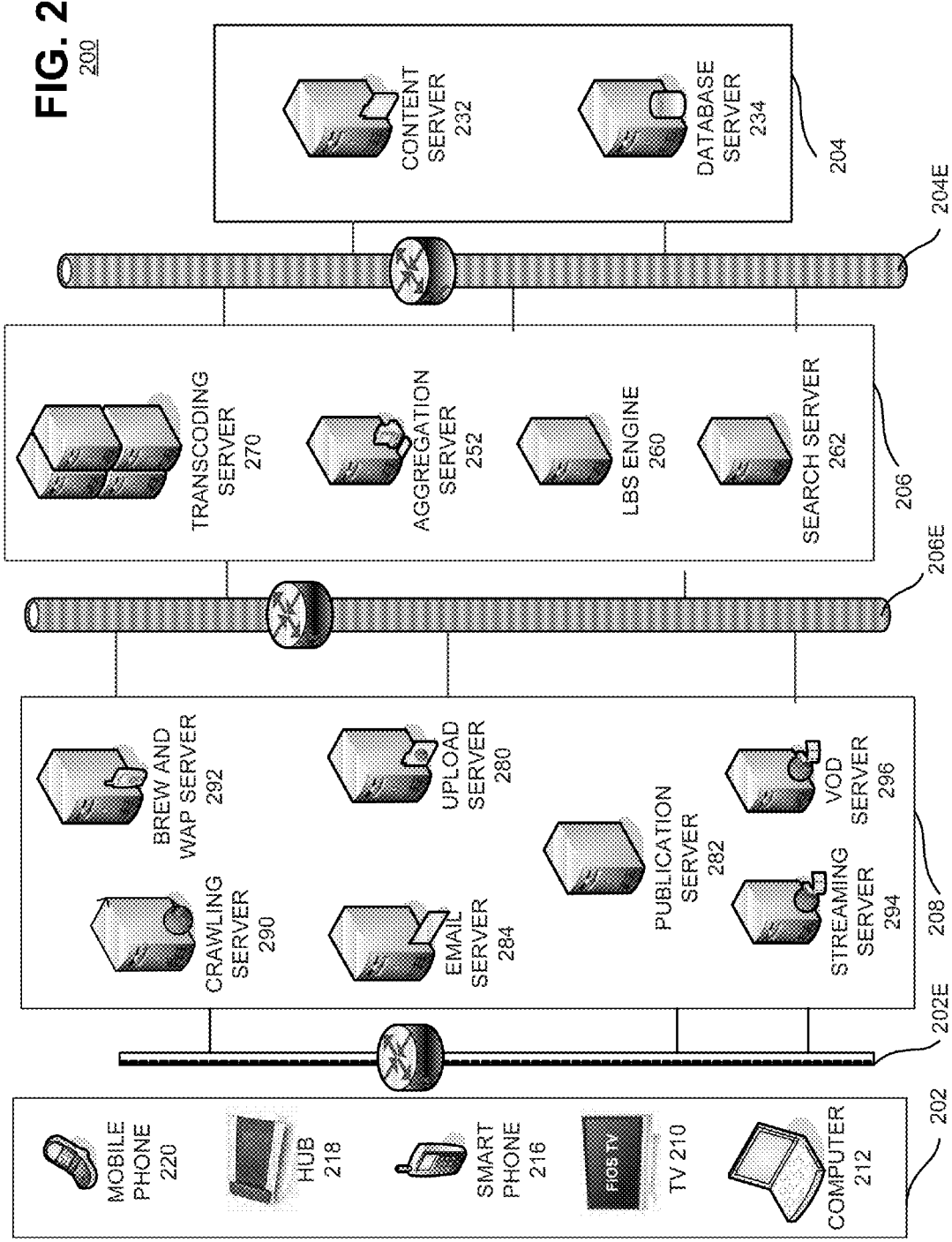
FIG. 2 shows an exemplary network in which embodiments described herein may be implemented.

FIG. 2 shows an exemplary network 200 in which embodiments described herein may be implemented. As shown, network 200 may include a device layer 202, a content storage layer 204, an application layer 206, and a content ingress/egress layer 208. Application layer 206 may lie between device layer 202 and content storage layer 204. Content ingress/egress layer 208 may lie between device layer 202 and application layer 206. Application layer 206 may facilitate the exchange of messages (e.g., communications) between device layer 202, content storage layer 204, and content ingress/egress layer 208. Although FIG. 2 does not show connections between the servers of each layer, each component of each layer may communicate with each other component in the layer. In fact, each component in network may communicate with every other component.

Device layer 202 may include, for example, a computer 212, a television (TV) 210, a smart phone 216 (e.g., a Blackberry™, Treo™, etc.), a communication hub (hub 218), a mobile phone 220, and/or another type of communication device. Any of devices 210-220 may be considered user devices. Content storage layer 204 may include content storage server 232 and database (DB) server 234. Application layer 206 may include an aggregation server 252, a location based services engine (LBS engine) 260, a search server 262, and a transcoding server 270. Ingress/egress layer 208 may include an upload server 280, a publication server 282, an email server 284, a crawling server 290, and a BREW (Binary Run Time Environment for Wireless), wireless-access protocol (WAP) server 292, streaming server 294, and Video-on-Demand (VoD) server 296. Layers 202, 208, 206, and 204 communicate through interfaces 202E, 206E, and 204E, described below.

Computer 212 may include one or more computer systems for hosting programs, databases, and/or applications. Computer 212 may include a laptop, desktop, or any other type of computing device. Computer 212 may include a browser application program for navigating a network, such as the Internet. Computer 212 may include a media application program for storing, organizing, and playing digital media. For example, the media application may play media (e.g., music or video) stored in computer 212 and/or stream media stored elsewhere, such as on content storage server 232, streaming server 294, and/or VoD server 296. The media application may create play lists of digital media and slide shows of photographs. The media application may remember a user's favorite music, movies, videos, etc. The media application may download digital media content from, for example, television broadcasts, the Internet, and/or content storage server 232.

TV 210 may include a device capable of receiving and reproducing video and audio signals, e.g., a video display device. TV 210 may include a liquid crystal display (LCD), a cathode ray tube (CRT), a plasma display, etc. TV 210 may be associated with a set-top box (STB) (not shown). The STB may include a computer device, such as a cable card, for hosting programs, databases, and/or applications. In one embodiment, TV 210 may include the STB in the same housing. The STB may receive communications from a cable and/or network service provider and may output video signals for display on TV 210. The STB may send communications to a cable and/or network service provider, e.g., requests for content for display. The STB may be used to order and receive VoD content from a content provider through, for example, VoD server 296. TV 210 may be associated with a remote control (not shown). The remote control may include control keys to navigate menus displayed on the TV, for example, and to otherwise control functions of TV 210 and/or the STB. TV 210 may, for example, perform the same functions as computer 212.

Smart phone 216, hub 218, and/or mobile phone 220 may allow a user to place telephone calls to other user devices. An example of hub 218 includes the Verizon Hub™. In one embodiment, smart phone 216, hub 218, and/or mobile phone 220 may perform the same functions, including viewing and generating media, as TV 210, mobile phone 220, and/or computer 212. Smart phone 216, hub 218, and/or mobile phone 220 may be able to execute programs in BREW, Java Platform Micro Edition (J2ME or JME), and/or Mobile.NET.

In one embodiment, devices 210-220 may include a camera and/or microphone for recording still images, moving video, and/or sound. User devices 210-220 may use a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, user devices 210-220 may communicate with other devices through a wireless local network using WiFi (e.g., IEEE 802.11x). In other embodiments, user devices 210-220 may also communicate with other devices via a wired network. For example, smart phone 216, mobile phone 220, and hub 218 may communicate with other devices using a public-switched telephone network (PSTN), fiber-optic cable (e.g., Verizon FiOS™), or the Ethernet protocol.

Content server 232 may receive and store content (e.g., media such as audio and video). Content server 232 may deliver the stored content when requested, for example, to streaming server 294, VoD server 296, one of user devices 210-220, or any other component or server in network 200. Content server 232 may include one or more computer systems for hosting programs, databases, and/or applications. Content may also be stored in other components of network 200, such as streaming server 294, VoD server 296, and/or DB server 234.

DB server 234 may store user profiles and metadata associated with content in content server 232. Metadata may include attributes, characteristics, and other information about content (such as owner, creation date, author, file format, file location, permissions, etc.). User profiles may include user preferences, device numbers associated with users, among other information. DB server 234 may include one or more computer systems for hosting programs, databases, and/or applications.

Aggregation server 252 may include one or more computer systems for hosting programs, databases, and/or applications. Aggregation server 252 may run a web server application, such as Apache, to serve web pages when requested. Aggregation server 252 may store metadata for content stored in content server 232, for example. In one embodiment, aggregation server 252 stores the metadata for the most popular content retrieved by user devices, such as user devices 210-220. Aggregation server 252 may also format and store metadata in DB server 234.

LBS engine 260 may include one or more computer systems for hosting programs, databases, and/or applications. LBS engine 260 may store information about particular locations. For example, LBS engine 260 may store maps associated with particular latitudes and longitudes and/or particular addresses. LBS engine 260 may serve such maps when queried with a location, for example.

Search server 262 may include one or more computer systems for hosting programs, databases, and/or applications. Search server 262 may store information about content (e.g., the content stored in content server 232), such as metadata (e.g., stored in DB server 234), and may index the information. Search server 262 may allow for users to perform searches of content.

Transcoding server 270 may include one or more computer systems for hosting programs, databases, and/or applications. Transcoding server 270 may convert an audio, video, or graphic file from one format to another (e.g., from one bit rate to another bit rate, from one resolution to another, from one standard to another, from one file size to another, etc.). Transcoding server 270 may allow different audio, video, and/or graphic files to be displayed or played on any device in network 200. Examples of audio formats include MP3, WMA (Windows Media Audio), AAC (Advanced Audio Coding), QCP (Qualcomm Code Prediction), QCELP (Qualcomm Code Excited Linear Prediction), EVRC (Enhanced Variable Rate Codec), AMR (Adaptive Multi-Rate), Ogg Vorbis, etc. Transcoding server 270 may convert an audio file from any of these formats into any other one of these formats, for example, or into the same format but at a different rate, resolution, size, etc.

In one embodiment, transcoding server 270 may include a cluster of servers. Each server in a cluster may perform the same function as other servers in the cluster, for example. A cluster of servers may provide for scalability, load balancing, and reliability.

BREW and WAP server 292 may receive communications from one or more user devices (e.g., mobile phone 220) for forwarding to other devices (e.g., upload server 280 and/or content server 232). BREW and WAP server 292 may also authenticate user devices (e.g., mobile phone 220) by, for example, communicating with an authentication server (not shown). BREW and WAP server 292 may communicate with devices (e.g., mobile phone 220) using secure channels implementing, for example, SSL (Secure Socket Layer) protocols or TLS (Transport Layer Security) protocols. BREW and WAP server 292 may receive Short Message Peer-to-Peer Protocol (SMPP) messages (e.g., SMS (Short Message System) messages) from devices (e.g., mobile phone 220) and pass the received SMPP messages to other components in network 200 and vice versa. In one embodiment, communications from mobile phone 220 to upload server 280, and other components in network 200, may pass through BREW and WAP server 292.

Upload server 280 may receive content (e.g., video and/or audio) from user devices, such as user devices 210-220. Upload server 280 may forward the content to transcoding server 270 for converting into different formats for different user devices. Upload server 280 may also forward information about the uploaded content to aggregation server 252 so that aggregation server 252 may create or supplement metadata for a metadata file to correspond to the uploaded content. Upload server 280 may include one or more computer systems for hosting programs, databases, and/or applications.

Publication server 282 may receive requests from user devices, such as user devices 210-220, for content (e.g., to view video and/or listen to audio) in network 200. The content may be private content stored in content server 232, for example, or public content available to all user devices. Publication server 282 may respond to requests by providing an address, such as URI or URL, for example, for the requested content. Upload server 280 may include one or more computer systems for hosting programs, databases, and/or applications.

Email server 284 may receive content from user devices, such as user devices 210-220. Email server 284 may upload the content to upload server 280 for making the content available to user devices in network 200, such as user devices 210-220. Email server 284 may include one or more computer systems for hosting programs, databases, and/or applications.

Crawling server 290 may crawl a network, such as the public Internet, to retrieve content (public or private) available on the network. For example, crawling server 290 may crawl blogs and/or YouTube.com for publically available content. Crawling server 290 may upload the content to upload server 280 for making the content available to user devices in network 200, such as user devices 210-220. Crawling server 290 may include one or more computer systems for hosting programs, databases, and/or applications.

Streaming server 294 may stream content (e.g., provide audio and/or video for real-time viewing, that is, viewing while streaming server 294 is still sending the content) to user devices. For example, streaming server 294 may send a movie to TV 210 and TV 210 may play the movie while still downloading the movie (e.g., with buffering, etc.). As such, streaming server 294 may store content requested by users devices 210-220. If streaming server 294 does not have the content, then it may download the content from content server 232. Streaming server 294 may be a large, distributed network of servers located in different geographic neighborhoods close to customer homes for fast delivery of content. In one embodiment, streaming server 294 may include user generated content and content collected by crawling server 290.

VoD server 296 may stream content to user devices. For example, VoD server 296 may send a movie to TV 210 and TV 210 may play the movie while still downloading the movie (e.g., with buffering, etc.). As such, VoD server 296 may store content requested by user devices 210-220. If VoD server 296 does not have the content, then it may download the content from content server 232. VoD server 296, like streaming server 294, may be a large, distributed network of servers located in different geographic neighborhoods close to customer homes for fast delivery of content. In one embodiment, VoD server 296 may include content generated by content providers, such as movie studios, network television studios, etc.

In other embodiments, network 200 may include more, fewer, or different devices. For example, network 200 may include a voice-to-text (V2T) server and a V2T engine server. Moreover, one or more devices 210-296 may perform one or more functions of any other device in network 200. Furthermore, one or more of devices 210-296 may be remotely located from each other, e.g., devices 210-296 may be geographically diverse. Although FIG. 2 shows devices 210-296 coupled to each other in a particular configuration, devices 210-296 may also be arranged in other configurations, either coupling directly with each other or through one or more networks, such that any one of devices 210-296 may communicate with any other one of devices 210-296. For example, any one of devices 210-296 may communicate with any other one of devices 210-296 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Besides the devices shown in FIGS. 1 and 2, devices coupled to network 112 and 200 may include any computational device, including among other things: a camcorder; a personal computer; a telephone; a personal communications system (PCS) terminal that may combine a cellular telephone data communications capabilities; an electronic note pad; a personal music player (PMP); a personal digital assistant (PDA) that may provide Internet/intranet access, web browser, organizer, calendar, and a global positioning system (GPS).

Figure 3:
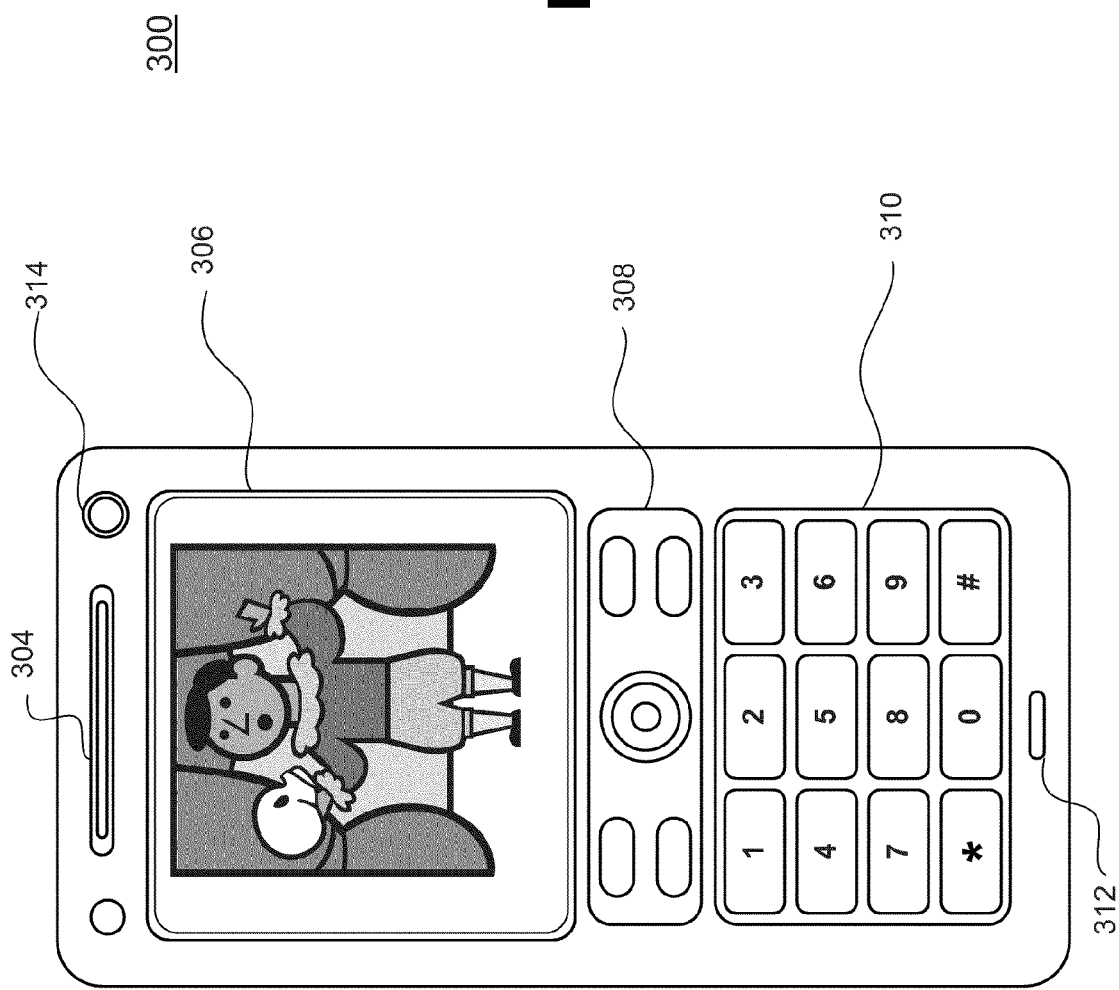
FIG. 3 is a diagram of an exemplary user device, such as one of the user devices in the network of FIG. 2.

FIG. 3 is diagram of an exemplary user device 300, such as one or more of user devices 210-220. As illustrated, user device 300 may include a speaker 304, a display 306, control keys 308, a keypad 310, a microphone 312, and a camera 314. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may also display a graphical user interface (GUI).

Control keys 308 may permit the user to interact with user device 300 to cause user device 300 to perform one or more operations, such as interacting with a media player and media manager application. Control keys 308 may include soft keys that may perform the functions indicated on display 306 directly above the keys. Keypad 310 may include a standard telephone keypad and may include additional keys to enable inputting (e.g., typing of) information into user device 300. Microphone 312 may receive audible information from the user. Camera 314 may enable a user to view, capture and store media (e.g., images, video clips) of a subject in front of device 300.

Figure 4:
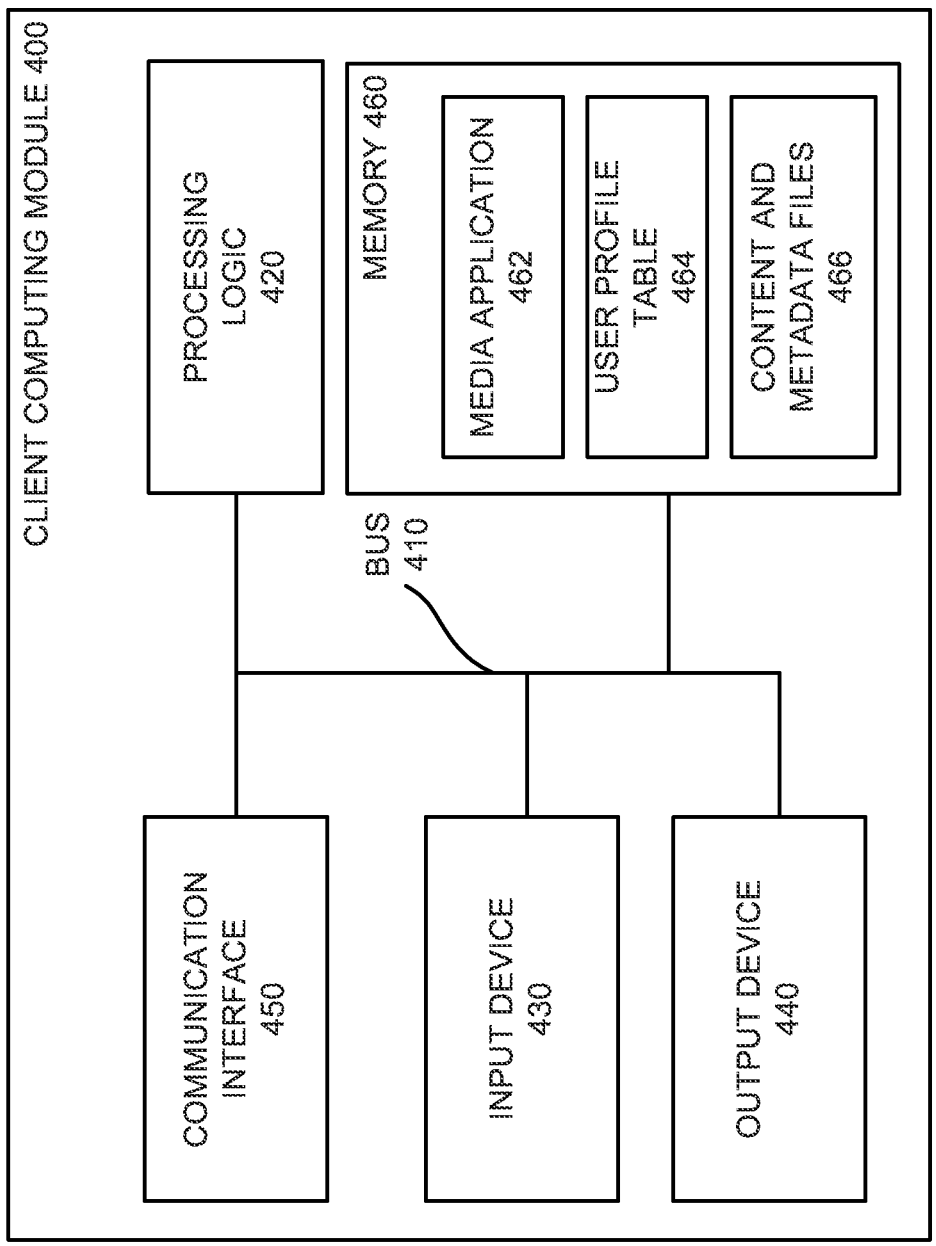
FIG. 4 is a block diagram of exemplary components of a client computing module.

FIG. 4 is a block diagram of exemplary components of a client computing module 400. User devices 210-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a camera (e.g., camera 314), a remote control, a touch-screen display (e.g., display 306), etc. Input device 430 may include an accelerometer that may allow client computing module 400 to measure acceleration and movement of the device that includes the client computing module. Output device 440 may include a device that outputs information to the user, such as a display (e.g., display 306), a printer, a speaker (e.g., speaker 304), etc. Output device 440 may also include a vibrator to alert a user.

Input device 430 and output device 440 may allow the user to activate a particular service or application, such as a media player and a content manager service. Input device 430 and output device 440 may allow the user to receive and view a menu of options and select from the menu options. The menu may allow the user to select the functions or services associated with applications executed by client computing module 400.

Communication interface 450 may include any transceiver-like mechanism that enables client computing module 400 to communicate with other devices and/or systems. Communication interface 450 may include a transmitter that may convert baseband signals to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc. Communication interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions. Memory 460 may include a media application 462 that allows a user to view, listen to, and share content, for example. Memory 460 may include content and metadata files 466. Content and metadata files 466 may include digital media (e.g., video and audio in any format such as MP3, WMA, AAC, QCP, QCELP, EVRC, AMR, Ogg Vorbis, etc.) or any type of document (e.g., Word documents, ODF (Open Document Format) documents, etc.) and corresponding metadata (e.g., attributes, characteristics, etc., of the content).

Memory 460 may also include a user profile table 464 that may store user preferences, user favorites, etc., as described herein.

Client computing module 400 may perform certain operations, as described below. Client computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described below.

Figure 5:
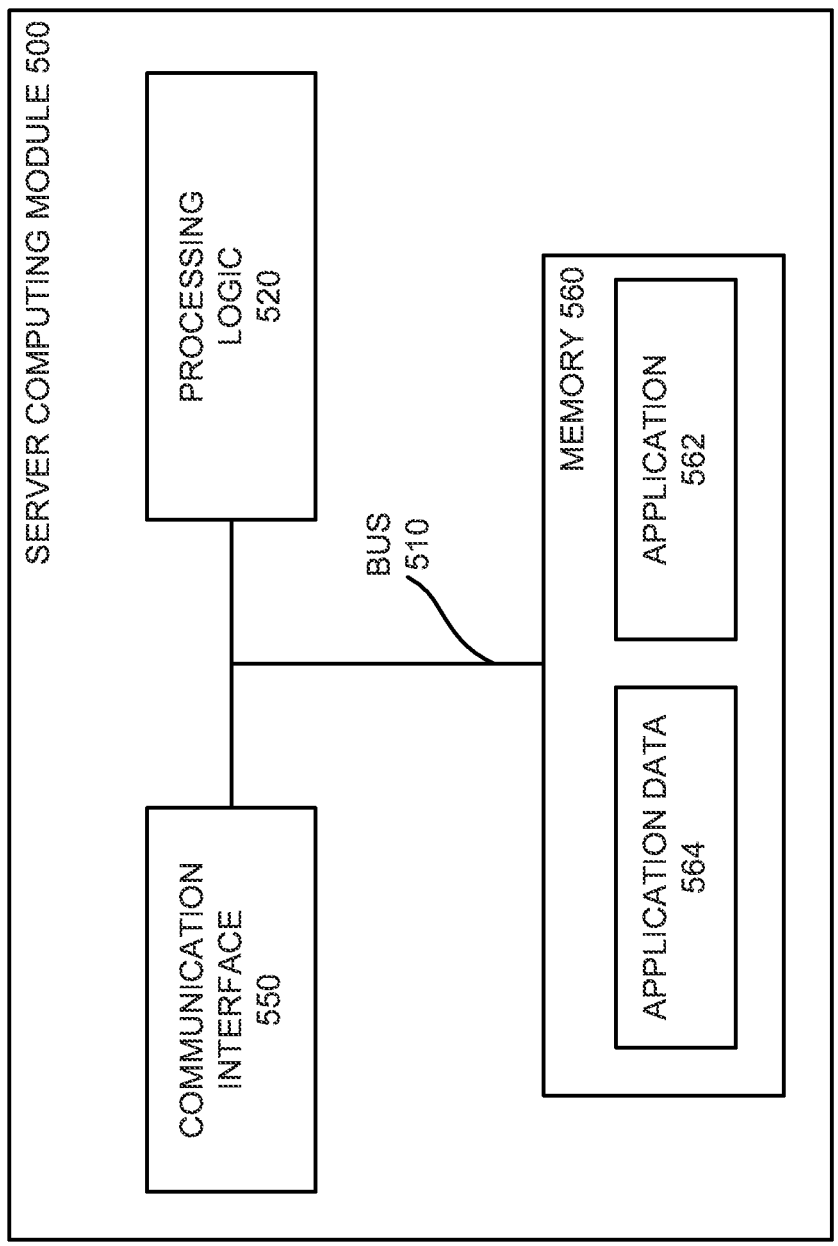
FIG. 5 is a block diagram of exemplary components of a server computing module.

FIG. 5 is a block diagram of exemplary components of a server computing module 500. Each of components 232-296 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to RF signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communication interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communication interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

FIG. 6 is a diagram of an exemplary content metadata table 600. Metadata table 600 may store characteristics, attributes, and other information about content (e.g., media file such as a video or audio file). Metadata table 600 may be stored in content storage server 232, DB server 234, aggregation server 252, or any component of network 200. In one embodiment, each piece of content stored in network 200 (e.g., in content storage server 232, DB server 234, and/or aggregation server 252) may be associated with a metadata table. Since there may be thousands, millions, or even billions of pieces of content, there may be thousands, millions, or even billions of metadata tables, like metadata table 600. In one embodiment, a metadata table may describe an individual piece of content or a collection of pieces of content including hierarchical levels.

Exemplary metadata table 600 includes a content identification (ID) field 602, a type field 604, an owner field 606, a creation date field 608, a public field 612, a private field 614, a group field 616, a geotag field 618, an author field 620, a copyright field 622, an original path field 624, a blog field 626, a codec field 640, a resolution field 642, and a streaming address field 644. Metadata may include descriptive information about the attributes, context, quality, condition, and/or characteristics of the corresponding content.

Content ID field 602 may include a value that may uniquely identify the piece of content described by metadata table 600. In one embodiment, ID field may store the location of the corresponding content, such as the URI or URL of the location of the content. In another embodiment, the location of the corresponding content, such as the URI or URL may be derived by the value in content ID field 602. In exemplary message tables 600, content ID field 602 includes the value of "1234." In this example, the corresponding content may be obtained by querying a database with this ID value, by forming a URI or URL from the ID value (e.g., www.content.com/1234), or both.

Type field 604 may indicate the type of content described by metadata table 600. As discussed above, content may include, for example, digital media (e.g., video and audio) or any type of document. Examples of values in type field 604 include VIDEO (as in exemplary metadata table 600), PICTURE, MUSIC, DOCUMENT, etc. Different types of content may include different attributes and thus different fields in a metadata table, for example. A song may have an album name field (not shown), whereas a video may have a director field (not shown), for example.

Owner field 606 may indicate the person, customer, or organization that owns the content. For example, if John Smith uploads a video of his son's first birthday, then the owner may be "John Smith," as indicated in exemplary metadata table 600. Creation date field 608 may include the date the content was created.

Public field 612 may include a value to indicate whether the corresponding content may be publically available and searchable. For example, a value of TRUE in public field 612 may indicate that anyone on the internet may access the content. A value of FALSE, on the other hand, may indicate that the corresponding content should not be publically available.

Private field 614 may include a value to indicate whether the corresponding content may only be viewed by the creator listed in owner field 606. A value of TRUE, for example, may indicate that only devices associated with the owner listed in owner field 606 may have access to the corresponding content. A value of FALSE, on the other hand, may indicate that the access to the content is not limited to only devices associated with the individual listed in owner field 606.

Group field 616 may include the name of a list of individuals (that may be defined by the owner listed in owner field 606) that may have access to the content. For example, as described in more detail below, a user profile associated with John Smith may list individuals whose devices may have access to the corresponding content.

Geotag field 618 may indicate the geographic location associated with the content. For example, as shown in metadata table 600, the content may be associated with the location defined by 71 degrees North latitude and 74 degrees West longitude. Other indicators of geographic location may include street address, city, state, postal code, and country.

Author field 620 may include the name of the author or artist associated with the content, for example. Copyright field 622 may indicate the copyright notice by the owner. In the example of metadata table 600, the copyright notice includes CC (Creative Commons), BY (attribution to the author), and NC (non-commercial use).

Original path field 624 may include the file location of the corresponding media as stored in content server 232. For example, an original path may include, as shown in exemplary metadata table 600, /HOME/JSMITH/1234. Blog field 626 may include an address, such as a URI or URL, to a description, discussion, or blog of the content.

Codec field 640.1 may indicate the way the first copy of the corresponding content was encoded. Values may include MPEG-4 (Motion Picture Expert Group-4), MPEG-2, etc. Resolution field 642.1 may indicate the resolution of the first copy of the corresponding content. Values include Low Definition (LD), High Definition (HD), and horizontal and vertical pixel values. As shown in metadata table 600, the first copy of the content with the ID of 1234 is encoded in LD resolution according to MPEG-2 (as defined in fields 640.1 and 642.1). The second copy of the content with the ID of 1234 is encoded in HD resolution according to MPEG-4 (as defined in fields 640.2 and 642.2).

Streaming address field 644.1 may indicate the address, such as a URI or URL, of the first copy of the corresponding content. The streaming address may be an address to streaming server 294, for example. In exemplary metadata table 600, the streaming address is http://content.com/1234.1. Streaming address field 644.2 may indicate the address of the second copy of the corresponding content. In exemplary metadata table 600, the streaming address is http://content.com/1234.2.

Metadata table 600 may include additional, different, or fewer fields than illustrated in FIG. 6. For example, metadata table 600 may include a length time field that may include the length of the corresponding content. As another example, metadata table 600 may include the size of the content file. The fields in metadata table 600 may themselves change depending on data type field 604. For example, the metadata for a movie may be different than the metadata for a song.

FIG. 7 is a block diagram of an exemplary user profile table 700. User profile table 700 may store information about a user, such as the user of one or more of devices 210-220. In one embodiment, a metadata table may describe a user's preferences and recently viewed content, for example. Exemplary user profile table 700 includes information about one user. In other words, exemplary user profile table 700 is a single record in a database of records where, for example, each record may be associated with a different user of network 200. User profile table 700 may be stored in one or more of devices 210-220 (e.g., in memory 460). User profile table 700 may also be stored in aggregation server 252 (e.g., in memory 560) or another device in network 200.

User profile table 700 may be stored in one or more of user devices 210-220. User profile table 700 may also be stored in content storage server 232, DB server 234, aggregation server 252, or any other component of network 200. In one embodiment, each user in network 200 (e.g., in content storage server 232, DB server 234, and/or aggregation server 252) may be associated with a user profile table. Since there may be thousands or millions of users in network 200, there may be thousands or millions of metadata tables, like user profile table 700.

User profile table 700 may include a name field 702, a device number (DN) field 704, a device model field 706, a device software version field 708, a group name field 710, a group members field 712, a history field 714, a favorites field 716, and a notification field 718. In one embodiment, a user may edit and update information stored in user profile table 700 using, for example, a browser in computer 212. User profile table 700 may include additional, different, or fewer fields than illustrated in FIG. 7.

Name field 702 may indicate the person, customer, or organization whose preferences and information is stored in remaining fields of user profile table 700. For example, exemplary user profile table 700 includes the name "John Smith" in name field 702. As such, the remaining fields in exemplary user profile table 700 describe the profile of John Smith.

Device number (DN) field 704 may include the device number(s) (e.g., phone number, mobile device number, URI, or URL) of the user device associated with the corresponding person named in name field 702. As shown in user profile table 700, the exemplary device number stored is 2022513434, which is associated with, for example, mobile phone 220.

Device software version field 708 may store a value indicative of the version of the software used in the device identified in DN field 704. Device model field 706 may store a value indicative of the model number of the device identified in DN field 704.

Group name field 710.1 may identify the name (nickname, shorthand, shortcut, etc.) of a first group of users defined in group members field 712.1 that have permission to view content associated with that group. Group members field 712.1 may be used to identify the users associated with the group name in name field 710.1. For example, as identified in exemplary user profile table 700, a first group named FAMILY refers to Jane Smith and Mary Smith. As shown in user profile table 700, the users associated with the group name FAMILY (e.g., Jane and Mary Smith) may access the content described in exemplary metadata table 600.

A user profile table may define more than one group name and group members field. For example, user profile table 700 includes a second group name field 710.2 and a second group members field 712.2 for defining the group FRIENDS as including Chris and Mary Jones.

History field 714 may list the content (identified by its content ID, for example) accessed by the user identified in name field 702. For example, John Smith (as shown in user profile table 700) most recently accessed the content having the ID of 1234 (e.g., the content described by metadata table 600). History field 714 also indicates that John Smith's last view of the content having the ID of 1234 was at 3:20.00 into the content (e.g., the stop time). That is, if John Smith started playing the content identified by the ID of 1234, and he wanted to continue playing where he left off, then he may start the content 3 minutes and 20 seconds into the content. Before viewing the content identified by the ID of 1234, as identified in history field 714, John Smith viewed the content identified by the ID of 5678.

Favorites field 716 may list the content (identified by its ID) that John Smith has bookmarked or listed as a favorite. As shown in exemplary user profile table 700, John Smith (as indicated in name field 702) listed the video described by metadata table 600 (e.g., with and ID of 1234) as a favorite. John Smith also lists the content identified by 8921 and 4524 as favorites.

Notification field 718 may include the device number(s) (e.g., phone number, mobile device number, URI, or URL) of the user device associated with the corresponding user identified in name field 702 for receiving updates to user profile table 700. As indicated in user profile table 700, when user profile table 700 is updated (e.g., history field 714 is updated to reflect new content viewed by John Smith), for example, then the user device associated with device numbers 2022513434, 2023459292, and 7035678989 (e.g., mobile phone 220, smart phone 216, and hub 218, respectively) may be notified. In one embodiment, user profile table 700 may also store the device models, device software version, etc., for the device numbers stored in notification field 718.

Figure 8:
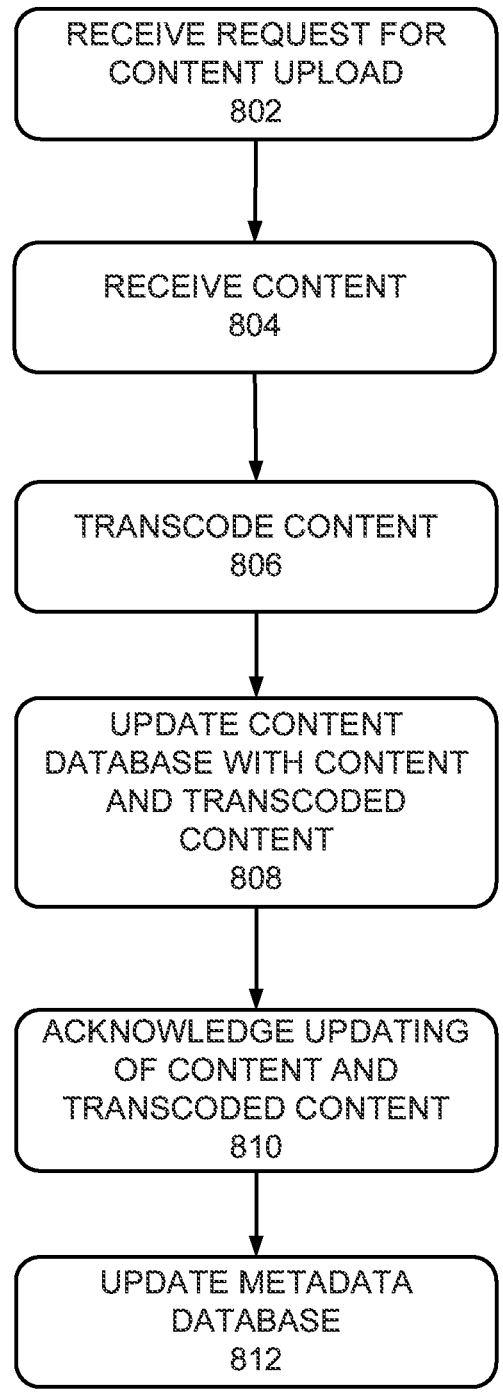
FIG. 8 is a flowchart of an exemplary process for uploading content in the network of FIG. 2.
Figure 9:
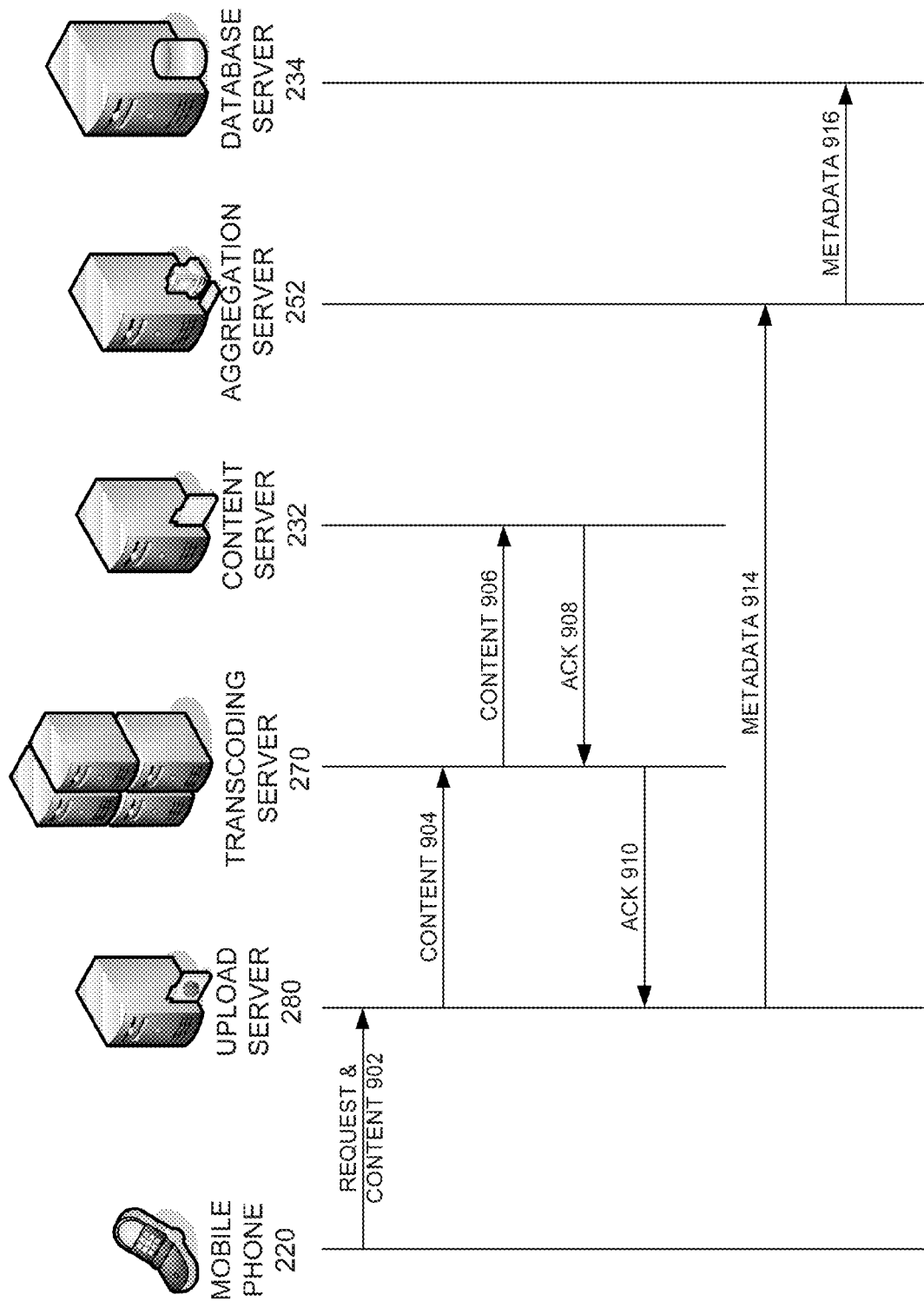
FIG. 9 is a diagram of exemplary network signals for uploading content in the network of FIG. 2.

FIG. 8 is a flowchart of an exemplary process 800 for uploading content in network 200. FIG. 8 is described with respect to FIG. 9, which is a diagram of exemplary network signals for uploading content in network 200. All or parts of process 800 may run in user devices 210-220, and/or any of the components in network 200.

In the following example, a user may record a movie on mobile phone 220, or mobile phone 220 may already have a movie stored in its memory. The movie stored in mobile phone 220, for example, may already be associated with metadata (e.g., embedded in the movie data file or in a separate file). The user of mobile phone may wish to upload it to network 200 for sharing with other users, for backup purposes, or for viewing on a different device. Process 800 may begin when upload server 280 receives a request to upload content (block 802). In one embodiment, the user may prompt the sending of a request to upload the content using, for example, a menu function in phone 220. In another embodiment, an application on mobile phone 220 may automatically upload content to network 200. In this latter embodiment, the content may, by default, have the private flag set to TRUE so that only the owner of mobile phone 220 (e.g., John Smith) may view the automatically uploaded content. In either case, an upload request signal (e.g., signal 902) may be sent from mobile phone 220 to upload server 280. In one embodiment the request (signal 902) may include the content and the associated metadata. In another embodiment, the user device (e.g., mobile phone 220) may send the content and metadata after receiving a message from upload server 280, for example.

Content may be received (block 804). Upload server 280 may receive the request and the content (signal 902). The content may include, for example, a movie file. The content may be transcoded (block 806). Upload server 280 may send the movie (signal 904) to transcoding server 270. Transcoding server 270 may transcode the content into different formats for different devices, for example. After successful transcoding, transcoding server 270 may send the content and the transcoded content to content server 232. If transcoding server 270 transcodes the content into five different formats, for example, then transcoding server 270 may send all five formats (e.g., five different files) to content server 232.

The content database may be updated with the uploaded content and the transcoded content (block 808). For example, content server 232 may receive the content and transcoded content (signal 906) and may store the content and transcoded content. The updating of the content database may be acknowledged (block 810). Content server 232 may, for example, send an acknowledgement (signal 908) to transcoding server 270 after content server 232 successfully stores the content and transcoded content. In addition, transcoding server 270 may send an acknowledgement (signal 910) to upload server 280 regarding the successful upload of content to content server 232. The acknowledgement may include a failure message if transcoding and/or uploading to content server 232 was not successful, for example.

The metadata database may be updated (block 812). For example, upload server 280 may update metadata table 600 to reflect that the video exists in many different formats and metadata table 600 may be sent to aggregation server 252 (signal 914). Aggregation server 252 may also send the metadata (e.g., metadata table 600) (signal 916) to DB server 234. Alternatively, a new record may be stored in metadata table 600 for each additional transcoded content, for example, and each new record may be sent to aggregation server 252 (signal 914) and/or DB server 234 (signal 916).

Figure 10:
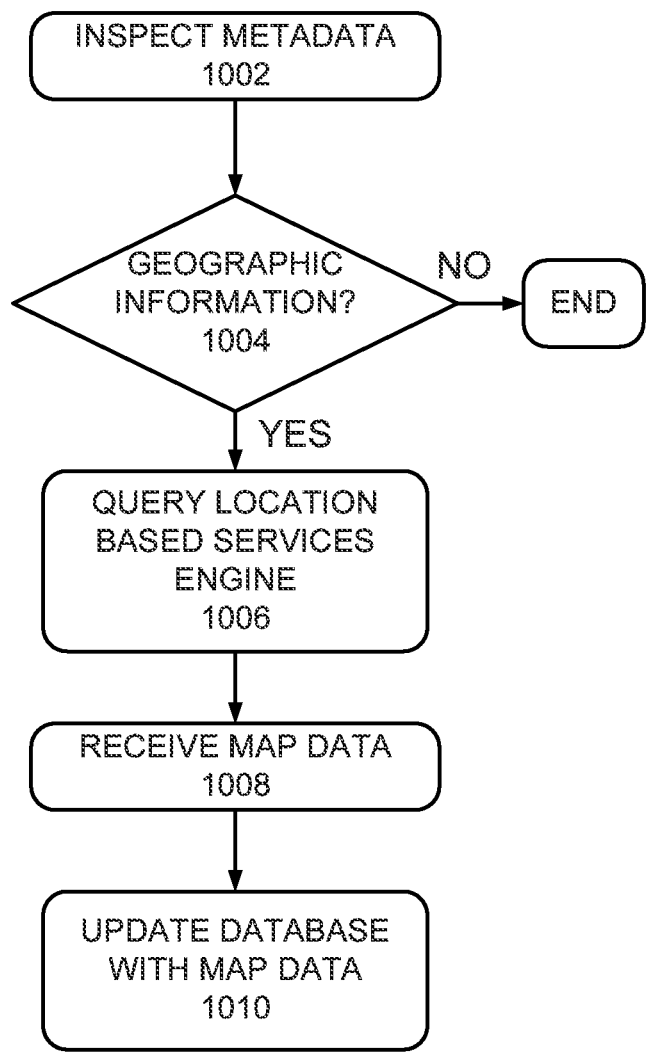
FIG. 10 is a flowchart of an exemplary process for processing content with geographic information.
Figure 11:
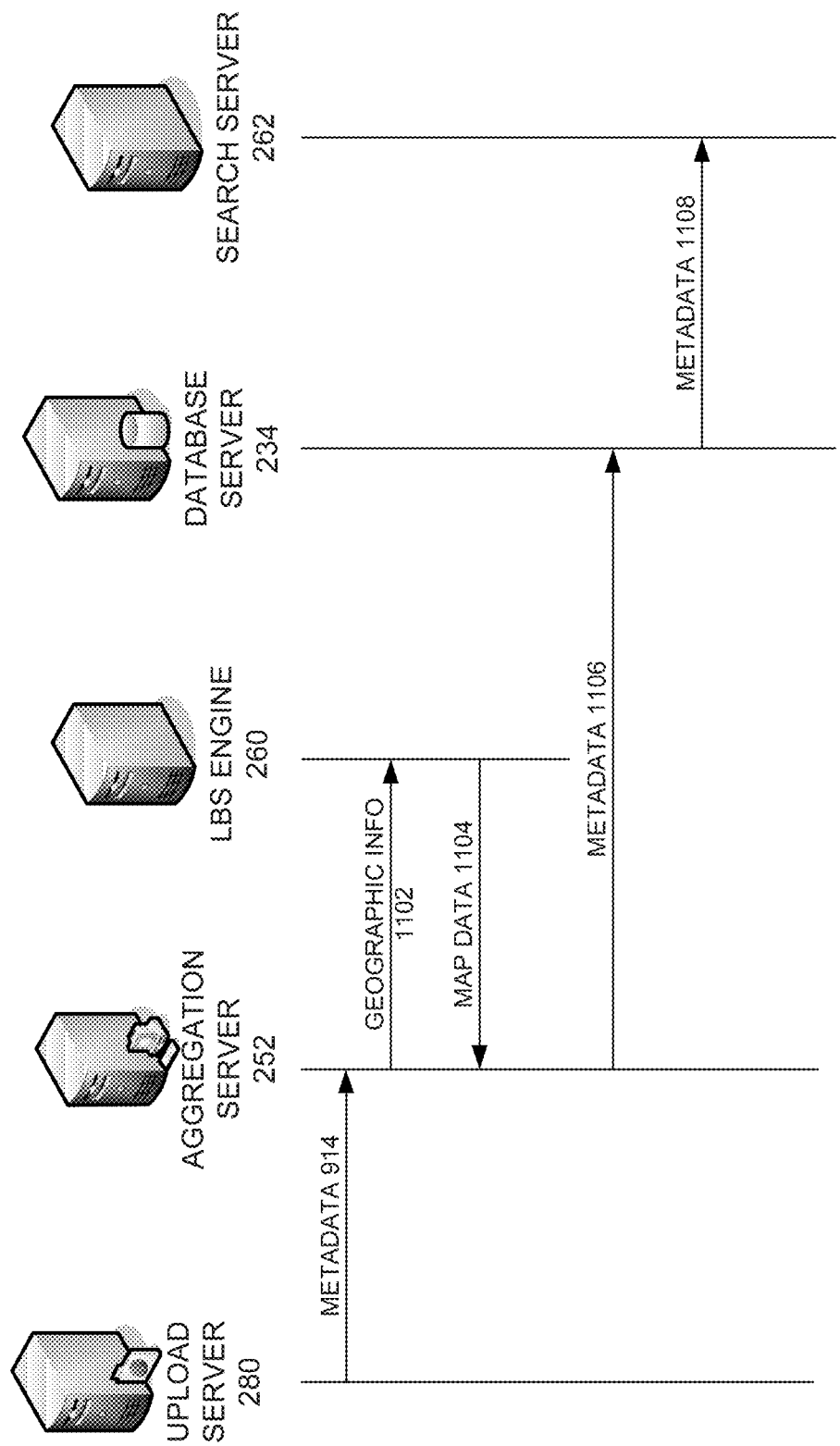
FIG. 11 is a diagram of exemplary network signals for processing content with geographic information.

FIG. 10 is a flowchart of an exemplary process 1000 for processing content with geographic information. FIG. 10 is described in conjunction with FIG. 11, which is a diagram of exemplary network signals for processing content with geographic information. Process 1000 may begin with the inspection of metadata (block 1002). For example, aggregation server 252 may inspect metadata table 600 received in signal 914 for geographic information (e.g., information stored in field 618).

If geographic information is not present (block 1004: NO), then process 1000 may end. If geographic information is present (block 1004: yes), then process 1000 may query a location based service engine regarding the geographic data (block 1006). For example, aggregation server 252 may query (signal 1102) LBS engine 260 regarding location information for the metadata. In the example of metadata table 600, the location information may include a latitude of 71 degrees North and a longitude of 74 degrees West.

Map data may be received (block 1008). For example, LBS engine 260 may respond with graphical map information (signal 1104) regarding the latitude of 71 degrees West and 74 degrees North and may send the map data to aggregation server 252 (signal 1106). Signal 1108 is discussed below with respect to FIG. 16A.

The database server may be updated with the map data (block 1010). For example, aggregation server 252 may update the metadata information (metadata table 600) and may forward the metadata information to DB server 234.

In the example above, mobile phone 220 stored a movie and the movie was uploaded from the phone to network 200 through upload server 280. In other embodiments, the content can come from any other source. For example, the content may come from web crawling server 290 that may retrieve content from the public internet. Content may also come from third-party providers or content providers (e.g., media companies such as CBS™, ABC™, MTV™, etc.) for uploading to network 200. Content from media companies may be marked as PUBLIC in metadata, or the metadata may include lists of subscribers to the content (using group field 616, for example). Content may be emailed (e.g., through email server 284) from a user device, such as computer 212 or mobile phone 220. In each of these cases, process 800 may begin when upload server 280 receives a request to upload content (block 802) and the content may be uploaded and received in upload server 280 (block 804), for example. In addition, the content uploaded to upload server 280 may include real-time content, such as weather and traffic, and not merely pre-recorded content. A secure communication channel may be provided to upload server 280 to ensure confidentiality. The secure communication channel may be provided using SSL, TLS, SFTP (secure file-transfer protocol), or SSH (secure shell).

A user may view on-line content for which he has permission to view, for example, using a file browser or a web browser (e.g. on computer 212 or mobile phone 220). The content a user may view, for example, may include the content he uploaded, the content his friends and family have shared with him, public content (e.g., from crawling server 290 and media companies), and content for which he has subscribed (e.g., uploaded from a media company).

Figure 12:
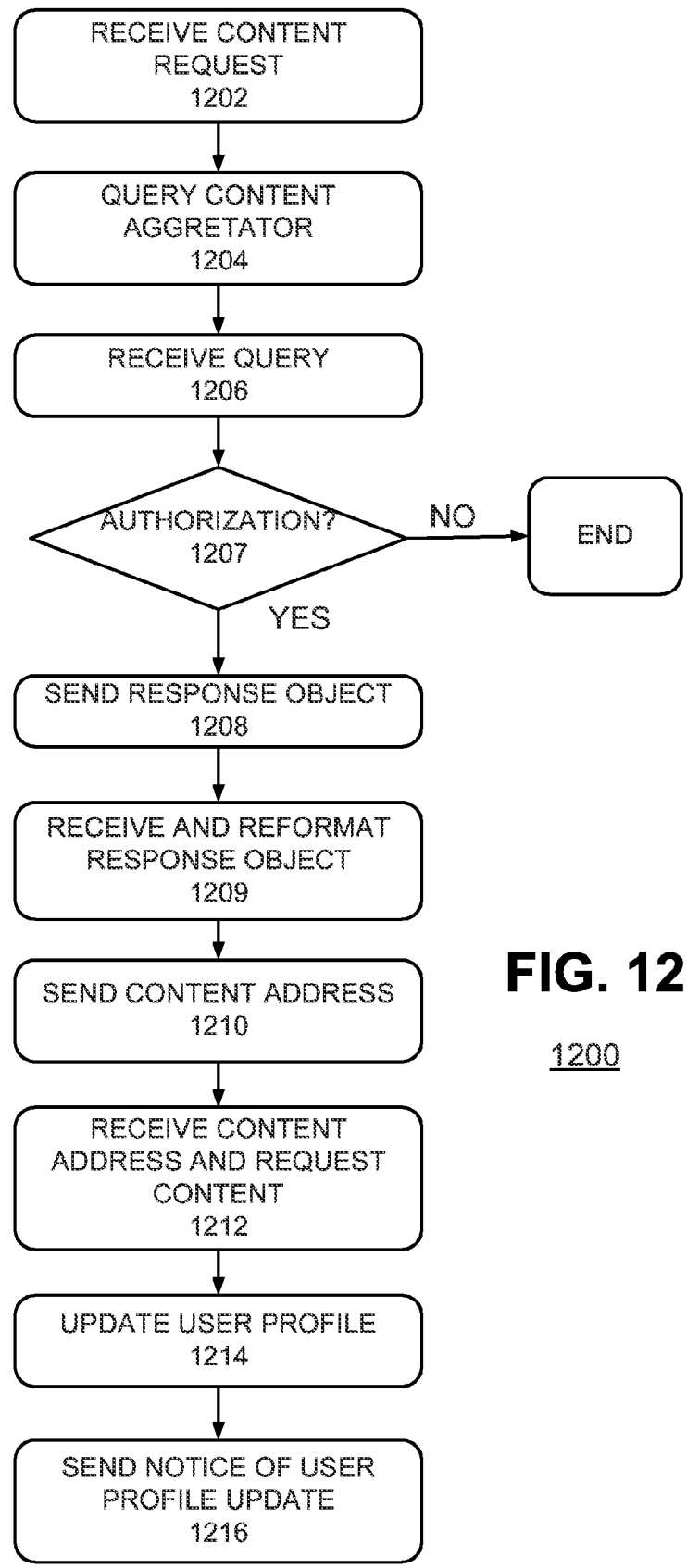
FIG. 12 is a flowchart of an exemplary process for receiving a request for content and delivering content.
Figure 13:
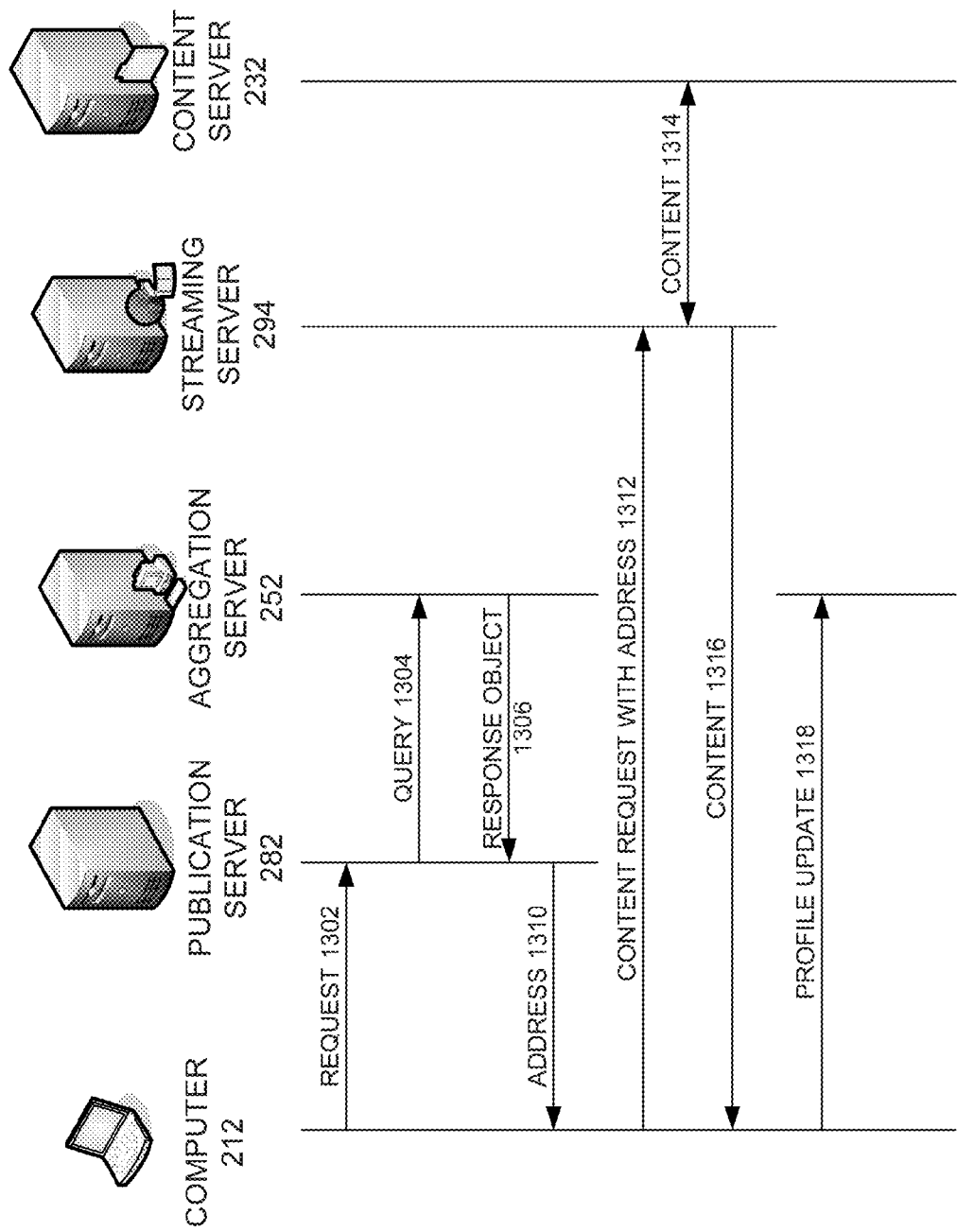
FIG. 13 is a diagram of exemplary network signals for receiving a request for content and delivering content.

FIG. 12 is a flowchart of an exemplary process 1200 for receiving a request for content and delivering content. FIG. 12 is described in conjunction with FIG. 13, which is a diagram of exemplary network signals for receiving a request for content and delivering content.

A request for content may be received (block 1202). A user at computer 212 may send a request (signal 1302) to publication server 282 to view the movie previously taken by mobile phone 220, uploaded to content server 232, and described in metadata table 600. The request (signal 1302) may specify, for example, the content ID and/or the requested format (e.g., MPEG-2 or MPEG-4 and/or the resolution). A content aggregator may be queried (block 1204). Publication server 282 may send a query (signal 1304) to aggregation server 252 regarding the content ID and format requested by the user device (e.g., computer 212).

The content query may be received (block 1206). Aggregation server 252 may receive the content query (signal 1304). Authorization for the user to receive the content may be determined (block 1207). Aggregation server 252 may inspect the user's profile, such as user profile table 700, and the metadata of the content to determine if the user has privileges to request the content (e.g., by inspecting public, private, and group fields 612-616). Authorization may also include authenticating the user by, for example, using a single-sign-on (SSO) system. If the user does not have authorization (block 1207: NO), then the process may end, or aggregation server 252 may send an error signal to publication server 282.

If the user has authorization (block 1207: YES) a response object may be sent (block 1208). Aggregation server 252 may respond with a response object (signal 1306) that identifies the location of the requested content. If aggregation server 252 does not have the location for the requested content, then aggregation server 252 may query DB server 234 for the metadata related to the requested content, for example.

The response object may be received and reformatted (block 1209). Publication server 282 may receive the response object (signal 1306) and may reformat the response object into an address usable for the device (e.g., mobile phone 220) that requested the content. For example, publication server 282 may reformat the response object into a URI or a URL.

The content address may be sent (block 1210). For example, publication server 282 may send the URI or URL (signal 1310) (determined in block 1208) to computer 212. The content address (signal 1310) may be received and the content may be requested (block 1212). Computer 212 may receive the address (signal 1310) (e.g., the URI or URL) and may use the address to access the content. For example, the URI or URL may include a web address to the content stored, for example, in streaming server 294. Computer 212 may send a request (signal 1312) including the address information received from publication server 282 (e.g., in signal 1310) to streaming server 294. The request (signal 1312) may include the start time from where the user device wishes to start streaming the file, for example, if the user device does not wish to start streaming from the beginning of the content. For example, the included time may be 1:00:00 if the user device determines (e.g., if the user wants) to start streaming at a point 1 hour into a 2 hour movie. If streaming server 294 does not have the content requested (e.g., in signal 1312), then streaming server 294 may request and receive the content from content server 232 (e.g., in signals 1314). Streaming server 294 may then send (e.g., stream) the content to computer 212 in the appropriate format.

The user profile may be updated (block 1214). As a result of user activity some of the content stored in user profile table 700 may change. For example, after viewing content, the stored history in field 714 may change. Computer 212, thus, may update history field 714 to reflect the most recent user activity. A notice of the update to the user profile may be sent (block 1216). Because of the change in the user profile, aggregation server 252 may be updated regarding the change (signal 1318). In one embodiment, the notification (signal 1318) may include the changed information in user profile table 700, such as just history field 714 in XML (eXtensible Markup Language) data in an HTTP message, for example. In another embodiment, the notification (signal 1318) may include the entire user profile table (e.g., user profile table 700) for that user. In yet another embodiment, the notification (signal 1318) may not include any updated information but may include an instruction to aggregation server 252 to request the updated information from mobile phone 220.

Figure 14:
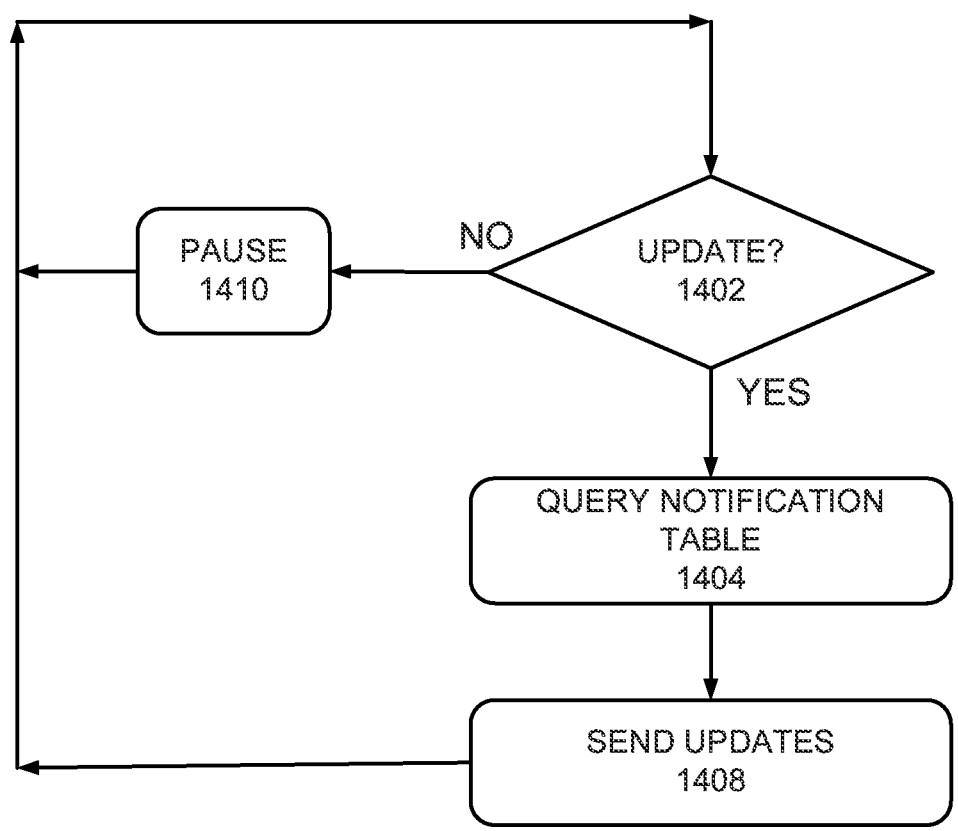
FIG. 14 is a flowchart of an exemplary process for updating a user profile in a user device.

FIG. 14 is a flowchart of an exemplary process 1400 for updating a user profile in a user device. FIG. 14 is described in conjunction with FIG. 15, which is a diagram of exemplary signals that may be sent and received in network 200 when updating a user profile. Process 1400 may begin when aggregation server 252 updates a user profile table (block 1402), such as user profile table 700. For example, as discussed above with respect to process 1200, aggregation server 252 may have updated a user profile to indicate new history information in history field 714. If the user profile table has been updated (block 1402: YES), then a notification field may be queried (block 1404). In one embodiment, aggregation server 252 may query notification field 718 stored user profile table 700 to determine which user devices should be notified of the update to the user profile table 700. In this example, as indicated in notification field 718, the update for changed user profile information may be sent to the user device associated with device number 2022513434 (e.g., mobile phone 220), the user device associated with device number 2023459292 (e.g., hub 218), and the user device associated with device number 7035678989 (e.g., smart phone 216).

In one embodiment aggregation server 252 forwards the updated information to DB server 234 (e.g., as signal 1504) to update the user profiles stored in DB server 234. In one embodiment, if aggregation server 252 does not currently have the user profile referenced in the notification (signal 1502), then aggregation server 252 may query DB server 234 for the profile.

Figure 15:
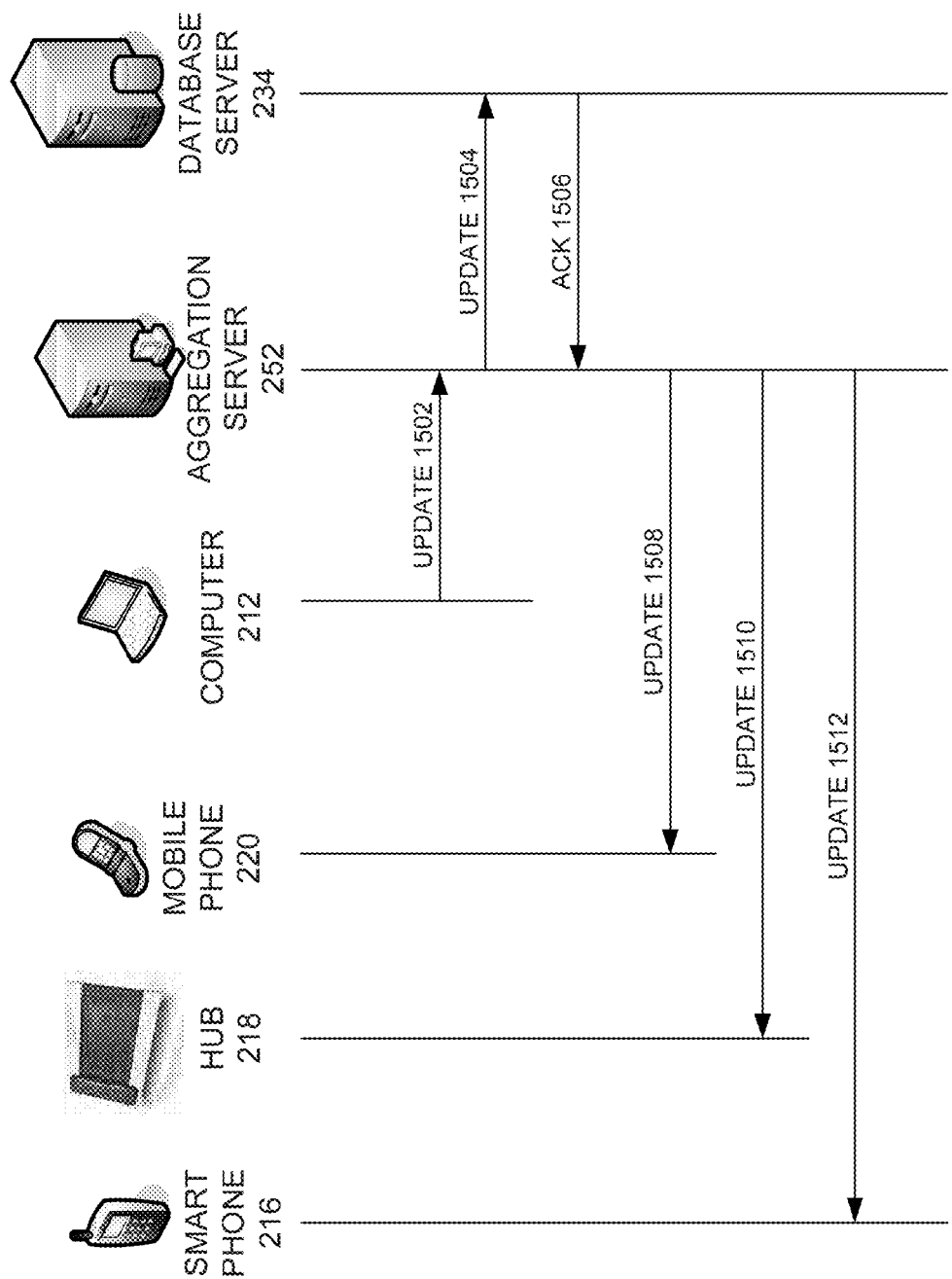
FIG. 15 is a diagram of exemplary signals that may be sent and received in the network of FIG. 2 when updating a user profile.

One or more user devices may be updated (block 1408). Exemplary notification messages are shown in FIG. 15, where aggregation server 252 sends update messages (signals 1508, 1510, and 1512) to mobile phone 220, hub 118, and smart phone 216. In one embodiment, signals 1508 through 1512 may all include the same or similar information, such as the changed profile information (e.g., information in field 714 in XML formatting) or the full profile (e.g., user profile table 700). In one embodiment, the notification (e.g., signal 1508) may include an SMS message. In this embodiment, the SMS message (e.g., signal 1508) may include a BREW application message in an SMS message.

After sending updates (block 1408), process 1400 may return to block 1402. In addition, if there has been no update to the aggregate message table (block 1402: NO), then process 1400 may pause (block 1410) and may return to block 1402.

According to process 1400, therefore, when a user's profile changes on one device, it may also change on some or all of her other devices. Thus, if a user watches the first half of a movie on her mobile phone, when she goes to her computer at home she can continue watching the same movie from the same point (because the profile stores the viewing history and the time watched, for example).

Figure 16A:
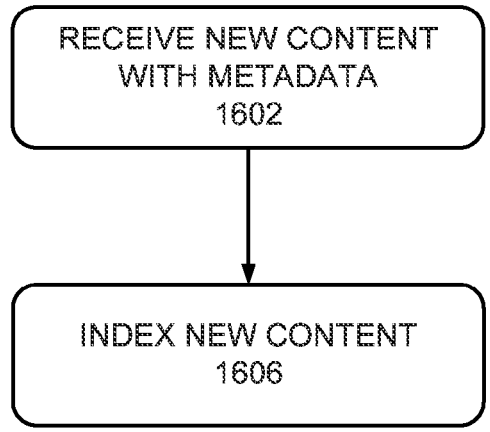
FIG. 16A is a flowchart of an exemplary process for storing and indexing content.

FIG. 16A is a flowchart of an exemplary process 1600A for storing and indexing content information. Process 1600A may be performed by search server 262, aggregation server 252, and/or DB server 234. Alternatively, process 1600A may be performed by any device in network 200. Process 1600A may begin with search server 262 receiving new content with metadata (block 1602). Search server 262 may receive content information on a periodic basis from DB server 234, such as every day (or night), every hour, or every few minutes, or whenever DB server 234 receives new metadata information about content. In one embodiment, if the content is real-time content, then search server 262 may receive the content information immediately; if the content is from a content provider, search server 262 may receive the content information once a day; if the content is from a user, search server 262 may receive the content information every few minutes. The metadata may include the information in metadata table 600, for example. Search server 262 may also store the transcribed text (if any) of content (either a separate text file or in a field in metadata table 600).

The content information (including the transcribed text, if any) may be indexed (block 1606). Search server 262 may index the information for searching by a search engine, which may also be provided for by search server 262.

Figure 16B:
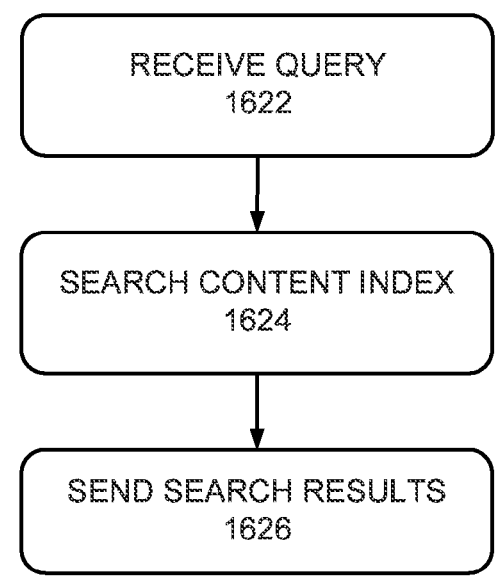
FIG. 16B is a flowchart of an exemplary process for searching for content.

FIG. 16B is a flowchart of an exemplary process 1600B for searching content. A search query may be received (block 1622). For example, search server 262 may receive a search query from a user device, such as mobile phone 220 or computer 212 (e.g., through a browser interface). The query may also include key words of the transcribed content should the metadata include transcribed text.

The content index may be searched (bock 1624). For example, search server 262 may search the index created in block 1606 according to the query provided in block 1622. The search results may be sent (block 1626). For example, the search results may be displayed on mobile phone 220 or computer 212, depending, for example, on the source of the query. Links to the content and content metadata may be provided in the search results. In this manner, a user may quickly search for various content.

The layers (e.g., device layer 202, application layer 206, content storage layer 204, and ingress/egress layer 208) may facilitate recovery and/or uninterrupted service (e.g., no loss of data, minimal down time) in the event of system failure in the middle layer (e.g., application layer 206 and/or ingress/egress layer 208). The layers may also allow for recovery and/or uninterrupted service in the event of system failure in the other layers (e.g., the device layer 202 and/or the content storage layer 204). In one embodiment, application layer 206 and/or ingress/egress layer 208 may be a state-less and/or memory-less layer that passes information to other layers. In other embodiments, application layer 206 and/or ingress/egress layer 208 may store information on a temporary or permanent (e.g., redundant) basis, however, for reasons such as improved performance. In one embodiment, if application layer 206 and/or ingress/egress layer 208 (or parts of these layers) fail or loses data, the data may be reconstituted or received from device layer 202 or content storage layer 204. In one embodiment, requests between device layer 202 and ingress/egress layer 208 and application layer 206 (or and between content storage layer 204 and application layer 206) may include a state-less protocol, such as HTTP, to facilitate a state-less application layer 206.

Because application layer 206 may, in one embodiment, be state-less, data requests from device layer 202 and content storage layer 204 may include the state parameters. For example, a data request from device layer 202 to application layer 206 may include state parameters such as a device number and content ID. In one embodiment, states may be permanently stored in device layer 202 (e.g., devices 210-220) or content storage layer 204 (e.g., content server 232). In another embodiment, state parameters may be only temporarily stored in device layer 202 and/or content storage layer 204. A state-less application layer may allow for more efficient load-balancing of the data requests received in application layer 206.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, in a network device from a first user device associated with a user profile, a media file captured by a camera or a microphone associated with the first user device, and storing the media file in a database;
   receiving, in the network device from a second user device associated with the user profile, a first request for the media file in the database;
   streaming the media file to the second user device over a network in a first format appropriate for the second user device;
   stopping the streaming of the media file to the second user device and associating a stop time with the stopping, wherein the stop time indicates a position in the media file;
   updating the user profile to include the stop time;
   querying the user profile to determine a list of user devices, other than the first and second user devices, to notify regarding the updating of the user profile, wherein the list of user devices identifies a third user device different than the first and second user devices;
   transmitting, via the network to each user device identified in the list of user devices, a notification of the updating of the user profile;
   receiving, in the network device from the third user device, a second request for the media file in the database, the third user device being associated with the user profile; and
   streaming, starting at the stop time, the media file to the third user device over the network in a second format appropriate for the third user device and different than the first format.

2. The method of claim 1, further comprising:
   determining whether the second user device is authorized to receive the media file based on metadata associated with the media file.

3. The method of claim 1, further comprising:
   transcoding the media file, wherein the first format and the second format include different video resolutions.

4. The method of claim 1, comprising:
   transmitting a first address of the media file to the second user device in response to the first request and transmitting a second address of the media file to the third user device in response to the second request.

5. The method of claim 1, further comprising
   indexing the media in a search server; and
   receiving search queries and transmitting search results in response to search queries.

6. A method comprising:
   receiving, in a network device from a first user device associated with a user profile, a media file captured by a camera or a microphone associated with the first user device;
   sending the media file to as second user device through a network in a first format appropriate for the second user device;
   receiving, from the second user device, an identity of the media file and a stop time indicating a position in the media tile up to which the media file was played;
   updating the user profile to include the stop time;
   querying the user profile to determine a list of user devices, other than the first and second user devices, to notify regarding the updating of the user profile to include the stop time, wherein the list of user devices identifies a third user device; and transmitting, via the network to each user device identified in the list of user devices, a notification of the updating of the user profile to include the stop time.

7. The method of claim 6, further comprising:
receiving, from the third user device, a second request for the media file; and
sending the media file to the third user device in a second format appropriate for the third user device and different than the first format.

8. The method of claim 6, further comprising:
determining whether the second user device is authorized to receive the media file based on metadata associated with the media file.

9. The method of claim 8, further comprising:
transcoding the media file, wherein the first format and the second format include different video resolutions.

10. The method of claim 7, further comprising:
transmitting a first address of the media file to the second user device in response to the first request and transmitting a second address of the media file to the third user device in response to the second request.

11. The method of claim 7, further comprising
indexing the media in a search server; and
receiving search queries and transmitting search results in response to search queries.

12. A system comprising:
a network device including:
one or more memories configured to store a first database including media files and a second database including user profiles associated with user devices;
a receiver to receive, from a first user device associated with one of the user profiles, a first request for a media file from the first database, wherein the media file was captured with a camera or a microphone in a user device associated with the one of the user profiles;
a transmitter to send the media file to the first user device in a first format appropriate for the first user device; and
a processor to:
associate a stop time associated with stopping the streaming of the media file to the first user device, wherein the stop time indicates a position in the media file,
update the one of the user profiles to include the stop time, and
query the one of the user profiles to determine a list of user devices, other than the first user device, to notify regarding the updating of the one of the user profiles to include the stop, wherein the list of user devices identifies a second user device,
wherein the transmitter is configured to automatically transmit, to each user device identified in the list of user devices, a notification of the updating of the user profile to include the stop time,
wherein the receiver is further configured to receive, from the second user device, a second request for the media file from the first database, wherein the second user device is different than the first user device and the second user device is associated with the one of the user profiles; and
wherein the transmitter is further configured to stream, starting at the stop time, the media file to the second user device in a second format appropriate for the second user device and different than the first format.

13. The system of claim 12, further comprising:
a mobile phone, wherein the media file was captured by a user associated with the one of the user profiles with the camera or the microphone in the mobile phone, and wherein the first database includes metadata associated with the media file, the metadata including information to determine whether the first user device is authorized to receive the media file.

14. The system of claim 12, further comprising a transcoder, wherein the first format and the second format include different video resolutions.

15. The system of claim 12, wherein the transmitter is further configured to send a first address of the media file to the first user device in response to the first request and send a second address of the media file to the second user device in response to the second request.

16. The system of claim 12, further comprising a search server including a processor to index the media files stored in the first database and a transmitter configured to send search results in response to search queries.

17. The method of claim 1, wherein the network device is a first network device, the method further comprising:
receiving, in the first network device, a notification from the second user device including the identity of the media file and the stop time;
determining that the first network device does not store the user profile associated with the second user device;
querying a second network device for the user profile associated with the second user device and receiving the user profile from the second network device in the first network device; and
updating the user profile with the identity of the media file and the stop time in the first network device.

18. The method of claim 1, wherein the first user device is a mobile phone, and wherein the media file was captured by a user, associated with the user profile, with the camera or the microphone in the mobile phone, and wherein the method further comprises:
transmitting, to each user device identified in the list of user devices, the stop time.

19. The system of claim 12, wherein the network device is a first network device, the system further comprising a second network device, and
wherein the receiver is configured to receive a notification from the first user device that includes the identity of the media file and the stop time, wherein the processor is configured to determine that the first network device does not store the user profile associated with the first user device and to query the second network device for the user profile associated with the first user device, wherein the receiver is configured to receive the user profile from the second network device, and the processor is configured to update the user profile with the identity of the media file and the stop time.

20. The system of claim 12, wherein the processor is further configured to inspect metadata associated with the media file to determine a geographic location associated with the media file, to query a geographic location database regarding the geographic location, and associate a geographic map with the media file.

21. The method of claim 18, further comprising:
inspecting metadata associated the with the media file to determine a geographic location associated with the media file; and
associating a geographic map with the media file.

* * * * *